United States Patent
Oishi et al.

[15] 3,636,360
[45] Jan. 18, 1972

[54] APPARATUS FOR DETECTION OF LIQUID LEVEL IN TRANSPARENT TUBE COMPRISING PHOTOCELL LOCATED TO RECEIVE LIGHT WHICH HAS BEEN TOTALLY REFLECTED

[72] Inventors: Asao Oishi; Takashi Yabuki; Kazuo Moriguti, all of Hitachi-shi, Japan

[73] Assignee: Hitachi, Ltd., Tokyo, Japan

[22] Filed: May 12, 1969

[21] Appl. No.: 823,747

[30] Foreign Application Priority Data

May 13, 1968 Japan....................................43/32057

[52] U.S. Cl..................................250/218, 73/293, 73/323, 356/134, 356/136
[51] Int. Cl..................G01f 23/00, G01f 23/02, G01n 21/46
[58] Field of Search.............356/134, 136; 250/218; 73/293, 73/323

[56] References Cited

UNITED STATES PATENTS

| | | | |
|---|---|---|---|
| 2,573,006 | 10/1951 | Good | 73/323 X |
| 1,737,126 | 11/1929 | Reyling et al. | 250/218 X |
| 2,240,988 | 5/1941 | Hertel | 73/293 |
| 2,350,712 | 6/1944 | Barsties | 73/293 |
| 2,351,100 | 6/1944 | Brelsford | 73/293 |
| 3,120,125 | 2/1964 | Vasel | 73/293 |

FOREIGN PATENTS OR APPLICATIONS

| | | | |
|---|---|---|---|
| 156,210 | 5/1939 | Austria | 73/293 |

*Primary Examiner*—James W. Lawrence
*Assistant Examiner*—T. N. Grigsby
*Attorney*—Craig, Antonelli & Hill

[57] ABSTRACT

A method for photoelectrically detecting a liquid level by projecting a light beam to a transparent tube communicating with a pressure liquid tank and detecting the redirected light beam, utilizing the difference of relative refractivity at the inner wall of the tube when liquid fills the tube and when not, and the apparatus. Means for receiving the light beam redirected from the tube is so disposed as to receive the light beam only when the tube is empty, or the liquid is lower than the detector.

5 Claims, 5 Drawing Figures

3,636,360

PATENTED JAN 18 1972

INVENTORS
ASAO OISHI, TAKASHI YABUKI and
KAZUO MORIGUTI

BY Craig, Antonelli, Stewart & Hill
ATTORNEYS

3,636,360

APPARATUS FOR DETECTION OF LIQUID LEVEL IN TRANSPARENT TUBE COMPRISING PHOTOCELL LOCATED TO RECEIVE LIGHT WHICH HAS BEEN TOTALLY REFLECTED

This invention relates to method and apparatus for photoelectrically detecting a liquid level in a pressure vessel such as a pressure oil tank.

Conventionally, the level of liquid in a pressure vessel is detected utilizing a float or the like. Variations in the position of a float are detected from the vessel through permanent magnets or the like, which actuate a detecting element such as a microswitch.

In more detail, a float changes its level according to the surface of the liquid and this variation is followed by a permanent magnet provided in the vessel. The variation of this magnet is further followed by another permanent magnet provided outside the vessel to detect the liquid level.

In apparatuses of this kind, however, the strength of the float should be increased as the pressure in the vessel increases. Also, since the variation of the float is derived from the vessel through permanent magnets, stronger magnets become necessary as the vessel becomes more solid, that is as the structural members of the vessel become thicker. Thus, the construction becomes complicated and the reliability is low.

Further, liquid level detecting apparatuses of said float type usually comprise a transparent communicating tube, such as a glass tube, to indicate the level of the liquid contained in the vessel so as to enable one to confirm the liquid level by one's eyes when a malfunction has occurred in the detector. This in uneconomical.

According to this invention, there can be provided a method and an apparatus for detecting a liquid level reliably by photoelectric means having a simple construction and economical cost, without the necessity to provide any detecting means inside the vessel and without the fear of being affected by the pressure inside the vessel and by the thickness of the constituent members.

This invention is based on a phenomenon that the relative refractivity and hence the critical angle of total reflection for a transparent plate, such as a glass plate disposed in air, is different from that for the same plate disposed in water. It is well known that the relative refractivity and hence the critical angle of total reflection at an interface are dependent on the indices of refraction of the two media forming the interface.

Therefore, a liquid level can be detected wit high accuracy by knowing the relative refractivity or the critical angle of total reflection of a transparent material forming a vessel or means for redirecting light rays when disposed in air and when in the liquid and arranging means for projecting light rays and means for receiving the light rays in connection with said means for redirecting the light rays.

According to an embodiment of the invention, means for redirecting light rays are so arranged that the light rays reflected or refracted by this means are oriented toward means for receiving light rays photoelectrically when the liquid level to be detected is below the position of reflection or refraction.

Said means for redirecting light rays may be formed of a transparent tube communicating with a main tank so as to display the same liquid level.

Liquid to be contained in the vessel may be transparent or opaque.

Further, the transparent tube for displaying a liquid level may have a circular or polygonal section.

This invention will be described in more detail hereinafter in connection with the accompanying drawings in which.

In the figures, similar parts are indicated by similar numerals.

Figure 1:
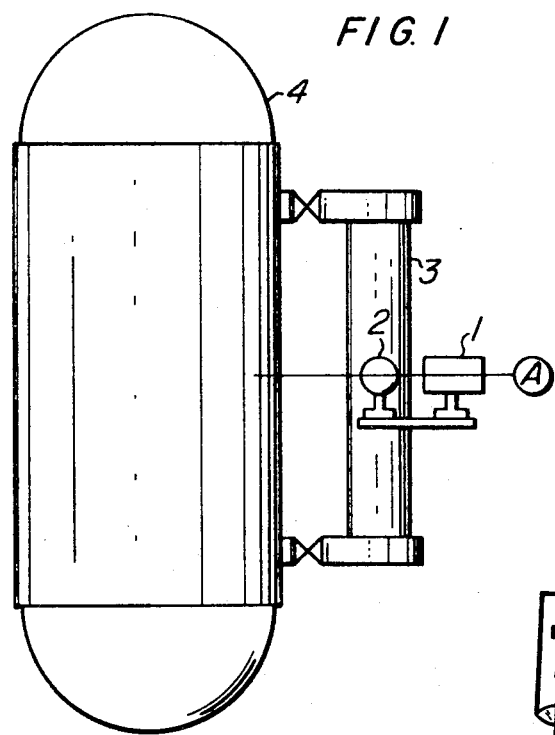
FIG. 1 is a schematic diagram illustrating the relative disposition of a photoelectric-type liquid level detecting apparatus of the invention.

A light projector 1 working as a light source comprises a lamp 5 and a condenser lens 6 for gathering light rays radiated from lamp 5 into a beam. Light rays radiated from the projector 1 are directed to a transparent tube 3 communicating with a pressure vessel 4 at both ends so as to indicate the same liquid level as that in the vessel 4 and then redirected at the inner surface of the tube to be received by a light receiver 2 comprising a photosensitive element 8, such as a phototransistor, and a condenser lens 7. The set position of the projector and the receiver is indicated at letter A.

Figure 2:
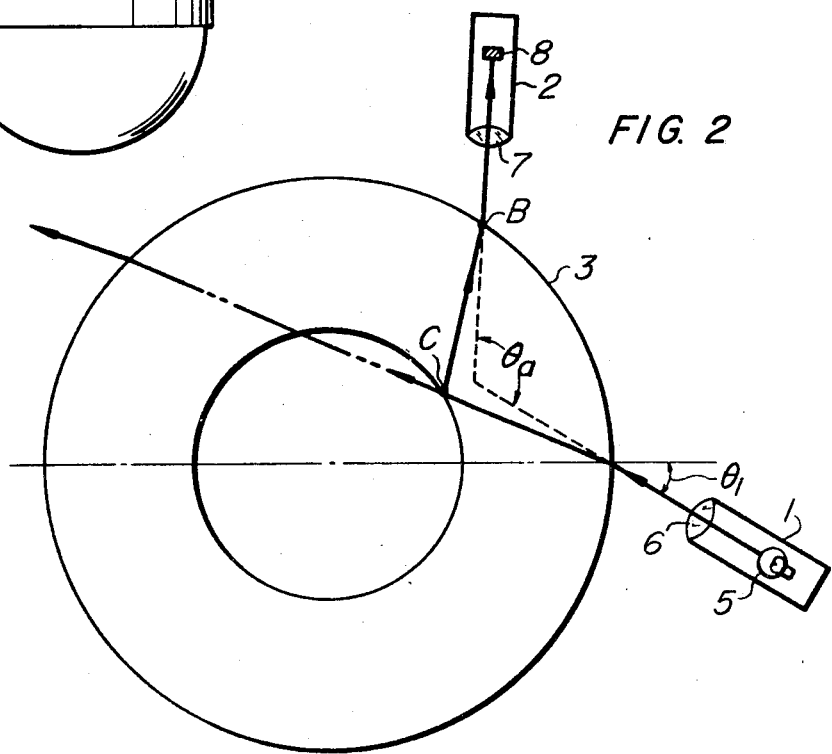
FIGS. 2 and 3 illustrate the concept of the invention.

Referring to FIG. 2, when the liquid level in the pressure vessel 4 is below the set level A of the detector, that is below the detecting position, light rays emitted from the projector 1 at an angle $\theta_1$ are totally reflected at the inner surface of the tube 3 at point C adjacent to air, then refracted at point B and finally received by the light receiver 2, the locus being illustrated by a solid line. When the receiver senses light rays, the photosensitive element 8 is energized to indicate that the liquid level is below the detecting position. When the liquid level is above the detection position, that is when the inner surface of the tube 3 is adjacent to liquid, light rays are not totally reflected but are mainly refracted at the surface and are transmitted through the tube containing liquid, as is schematically shown by the broken line with two dots. Thus, the receiver 2 receives much less or negligibly small amounts of light. This is due to the resemblance of the index of refraction of the liquid and the transparent material forming the tube 3, while the index or refraction of air and the transparent material differ to a relatively large extent. Thus, it is possible to change the direction of the redirected light rays at the inner wall of the tube greatly by selecting the incident angle to the larger than the critical angle of the total reflection for the air tube interface but smaller than that for the liquid-tube interface.

Figure 3:
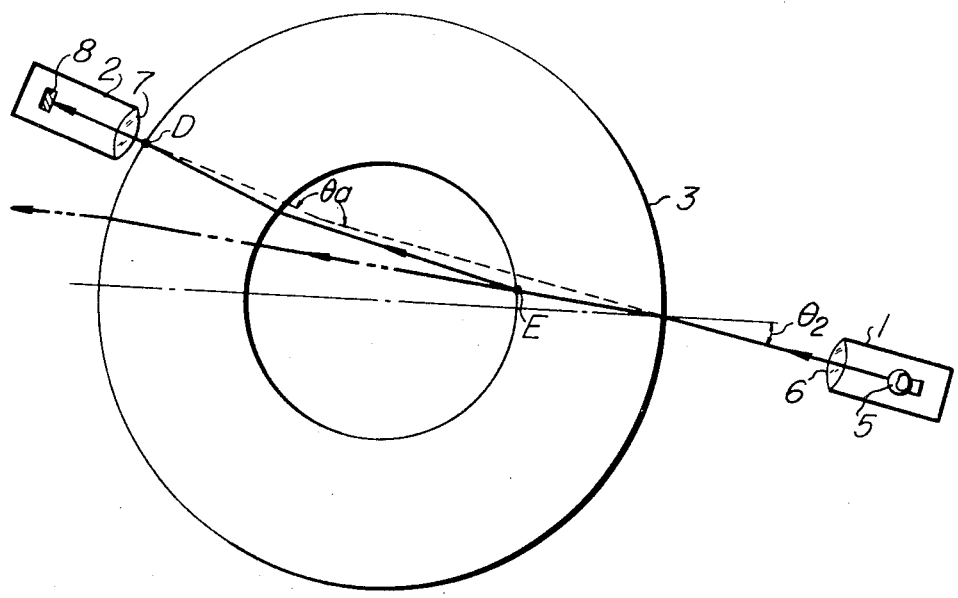

Alternatively, it is not always necessary to utilize total reflection, but instead the direction of the redirected light rays may be largely changed by utilizing the variation of refractivity at the interface. In FIG. 3, the projector 1 is arranged to emit light rays at an angle of $\theta_2$ with respect to an imaginary line passing through the center of the tube and the point on the outer surface of the tube at which light rays are directed, while in the embodiment as stated in FIG. 2 light rays are directed at an angle $\theta_1$. In FIG. 3, light rays emitted from the projector 1 proceed along the locus illustrated by the solid line to be received by the receiver 2 when the liquid level is below the detecting position. When the liquid level is above the detecting position, the light path beyond point E becomes that illustrated by the broken line with two dots. This variation is due to the fact that the indices of refraction of the transparent tube and the liquid are approximately equal but those of air and the tube are greatly different. More specifically, the relative refractivity of air and glass is about 1.58 whereas that of glass and water is about 1.2. In both cases of FIGS. 2 and 3, the receiver 2 is disposed at a position where the intensity of light rays transmitted through the tube 3 with a liquid surface below the detecting position is strongest. Thus, the relative angle $\theta a$ of the projector 1 and the receiver 2 should be appropriately selected based on the material, outer diameter and thickness of the transparent tube 3.

When the liquid surface is above the position A, the relative refractivity between the liquid and the material of the tube 3 becomes greatly different from that of air and the material of the tube 3 whereby the receiver 2 receives no light rays or a much less amount of light rays so that the photosensitive element 6 is not actuated, indicating that the liquid level is above the detecting position.

When light rays are projected in a beam having a certain width and the section of the tube is annular, incident angles have a certain range and light rays are reflected or refracted in a wider range of angles. In such a case, it may be difficult to effectively collect dispersed light rays by the receiver and to direct all the paths of light rays away from the light receiver when the liquid level becomes above the detecting position.

If the liquid contained in the vessel is opaque, when the liquid level is above the detecting position, light rays projected from the projector 1 are interrupted or absorbed by the liquid whereby the light receiver 2 is never actuated while it receives light rays reflected by or transmitted through the tube 3 when the liquid level is below the detecting position. Thus, even in such a case, a liquid level can be detected easily and accurately in a similar manner.

Figure 4:
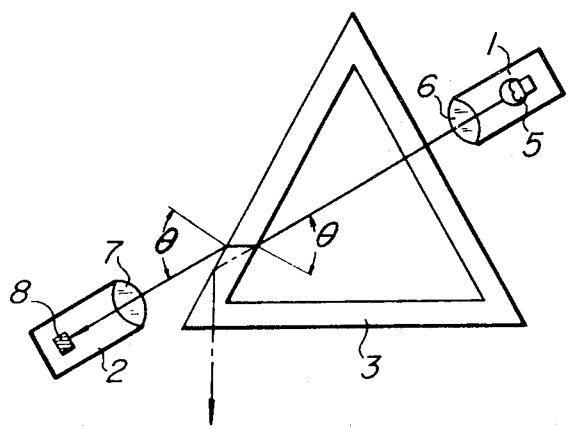
FIGS. 4 and 5 show other embodiments of liquid level detecting apparatus of the invention.
Figure 5:
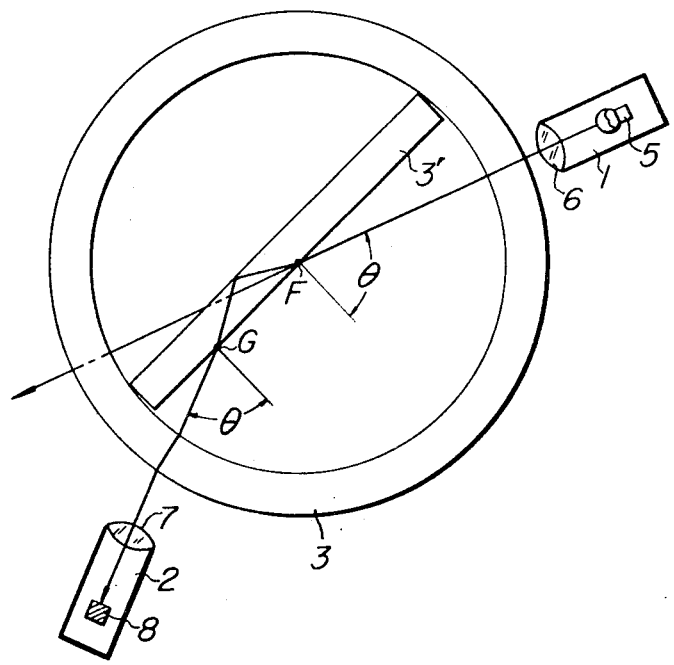

A cylindrical tube may provide the possibility that the reflected or refracted light rays are too widely dispersed to effectively detect the liquid level as is discussed above. Thus it may be suggested to employ a tube of polygonal section, such as the one shown in FIG. 4 and having a triangular section, so as to positively determine the direction of reflected or refracted light rays. It is apparent that a polygonal tube effectively works in a similar manner as those of FIGS. 2 and 3. Further the transparent tube 3 may be formed of glass, transparent synthetic resin or like material.

When it is difficult to shape the transparent tube into a desired form, a transparent plate 4' may be provided within the tube to perform the detection of the liquid level. The function of the plate 3' is similar to those of the inner walls of the tube 3 of FIG. 2, that is, light rays emitted from the projector 1 are refracted at point F and totally reflected at the inner surface of the plate 3' and finally received by the light receiver 2. When the liquid level is above the detecting position, the light path beyond point F will be that illustrated by broken line with two dots.

The assembly of the projector 1 and the receiver 2 may be changed in a vertical position along the tube by some means so that the level of the liquid surface in the tube and also its variation can be detected simply.

What is claimed is:

1. An apparatus for photoelectrically detecting a liquid level in a pressure vessel comprising:
   a transparent tube extending along the outside of said pressure vessel from a point adjacent the bottom thereof to a point beyond the highest liquid level and being connected at both ends with the inside of said vessel,
   means for projecting a light beam at said transparent tube, and
   means for receiving the light beam reflected by the surface of said transparent tube, said means including a photosensitive element which is located at a position to receive only the light beam which is totally reflected by said surface,
   wherein said projecting means is disposed so that the inner wall of said tube totally reflects the light rays from said projecting means through the tube wall when it is disposed in air and mainly refracts the light rays when it is disposed in liquid.

2. An apparatus for photoelectrically detecting a liquid level in a pressure vessel comprising:
   a transparent tube extending along the outside of said pressure vessel from a point adjacent the bottom thereof to a point beyond the highest liquid level and being connected at both ends with the inside of said vessel,
   means for projecting a light beam at said transparent tube,
   a transparent solid plate disposed in said tube with one of its surfaces at an angle to said beam, said plate being made of a material having a refractive index substantially equal to that of the liquid whose level is to be detected, and
   means for receiving the light beam reflected by the surface of said plate, said means including a photosensitive element which is located at a position to receive only the light beam which is totally reflected by said surface.

3. An apparatus for photoelectrically detecting a liquid level in a pressure vessel comprising:
   a transparent tube extending along the outside of said pressure vessel from a point adjacent the bottom thereof to a point beyond the highest liquid level and being connected at both ends with the inside of said vessel,
   means for projecting a light beam at said transparent tube, and
   means for receiving the light beam reflected by the surface of said transparent tube, said means including a photosensitive element which is located at a position to receive only the light beam which is totally reflected by said surface,
   wherein said tube has a cylindrical cross section and said projecting means is positioned with respect to said tube so that said beam will be totally reflected from the inner surface of said tube closest to said projecting means only when the level of said liquid is below the plane of said beam.

4. An apparatus for photoelectrically detecting a liquid level in a pressure vessel comprising:
   a transparent cylindrical tube positioned along the outside of said pressure vessel from a point adjacent the bottom of said vessel to a point adjacent the top thereof and being connected at both ends with the inside of said vessel,
   light projecting means for projecting a concentrated beam of light at a point on the inner surface of said transparent tube on the side thereof adjacent said light projecting means, said light projecting means being positioned with respect to said transparent tube so that said beam intercepts the inner surface of said tube at said point at an angle greater than the critical angle for air within the tube at said point and at an angle less than the critical angle for liquid in the tube at said point, and
   light detecting means positioned in line with the path of total reflection of said beam at said point for detecting said beam.

5. An apparatus according to claim 4, wherein said transparent cylindrical tube is made of a material having a refractive index approximately equal to the refractive index of the liquid whose level is to be detected.

* * * * *